US009632807B2

(12) United States Patent
Sim et al.

(10) Patent No.: US 9,632,807 B2
(45) Date of Patent: Apr. 25, 2017

(54) SYSTEM AND METHOD OF PROCESSING FOR FLEXIBLE INTERCEPTION OF COMMUNICATION BETWEEN SYSTEM LAYERS

(71) Applicant: Creative Technology Ltd, Singapore (SG)

(72) Inventors: Wong Hoo Sim, Singapore (SG); Darran Nathan, Singapore (SG)

(73) Assignee: Creative Technology Ltd, Singapore (SG)

( * ) Notice: Subject to any disclaimer, the term of this patent is extended or adjusted under 35 U.S.C. 154(b) by 27 days.

(21) Appl. No.: 14/712,668

(22) Filed: May 14, 2015

(65) Prior Publication Data

US 2016/0335099 A1    Nov. 17, 2016

(51) Int. Cl.
*G06F 9/445* (2006.01)
*G06F 17/30* (2006.01)
*A63F 13/61* (2014.01)

(52) U.S. Cl.
CPC .......... *G06F 9/44505* (2013.01); *A63F 13/61* (2014.09); *G06F 17/30141* (2013.01); *A63F 2300/209* (2013.01)

(58) Field of Classification Search
CPC .......... G06F 1/10; G06F 1/06; G06F 9/44505; G06F 17/30141; A63F 13/61; A63F 2300/209
USPC .......... 718/100, 1; 717/121, 168; 705/14.58, 705/14.73; 719/329, 328; 726/1; 463/42, 31, 32; 707/742
See application file for complete search history.

(56) References Cited

U.S. PATENT DOCUMENTS

| 7,659,819 | B2 * | 2/2010 | Loving | G06F 9/545 340/10.1 |
|---|---|---|---|---|
| 7,752,078 | B2 * | 7/2010 | Nakade | G06Q 30/0241 705/26.1 |
| 8,328,640 | B2 * | 12/2012 | Rom | A63F 13/12 463/42 |
| 8,523,680 | B2 * | 9/2013 | Lee | H04L 67/38 463/31 |
| 2004/0237071 | A1 * | 11/2004 | Hollander | G06F 9/4425 717/124 |
| 2004/0248649 | A1 * | 12/2004 | Arai | A63F 13/10 463/32 |
| 2006/0105841 | A1 * | 5/2006 | Rom | A63F 13/12 463/42 |
| 2007/0051201 | A1 * | 3/2007 | Matsubara | B22F 9/082 75/338 |
| 2009/0054140 | A1 * | 2/2009 | Beser | A63F 13/12 463/31 |
| 2009/0293057 | A1 * | 11/2009 | Larkin | G06F 9/468 718/1 |
| 2009/0328080 | A1 * | 12/2009 | Margarint | G06F 9/4443 719/329 |
| 2010/0332328 | A1 * | 12/2010 | Dharmaji | G06Q 30/02 705/14.64 |
| 2011/0145842 | A1 * | 6/2011 | Tofighbakhsh | H04L 45/306 719/328 |

(Continued)

*Primary Examiner* — Aurel Prifti

(74) *Attorney, Agent, or Firm* — Russell Swerdon; Desmund Gean

(57) ABSTRACT

A method for dynamically changing a fundamental attribute of an object in a game played using a system is provided. The system can include a system directory which includes a system file and a plurality of system layers including a transmit layer and a receive layer. Data signals are communicable from the transmit layer to the receive layer. The method can include identifying the object, the fundamental attribute of the object being associable with the system file when data signals communicated from the transmit layer are processed at the receive layer based on the system file. The method can further include inserting a configuration file to the system directory. The method can yet further include intercepting communication between the transmit layer and the receive layer so that the fundamental attribute of the identified object is modified based on the configuration file.

5 Claims, 6 Drawing Sheets

(56) References Cited

U.S. PATENT DOCUMENTS

| | | | |
|---|---|---|---|
| 2011/0307890 A1* | 12/2011 | Achilles | G06F 9/505 718/100 |
| 2012/0123867 A1* | 5/2012 | Hannan | G06Q 30/0261 705/14.58 |
| 2013/0151353 A1* | 6/2013 | Cobb | G06Q 30/02 705/14.73 |
| 2014/0006174 A1* | 1/2014 | Pearcy | G06Q 30/02 705/14.73 |
| 2014/0007140 A1* | 1/2014 | Hall | G06F 9/44505 719/328 |
| 2014/0129566 A1* | 5/2014 | Chang | G06Q 30/0205 707/742 |
| 2014/0189644 A1* | 7/2014 | Mueller | G06F 9/44505 717/121 |
| 2014/0282465 A1* | 9/2014 | Matenaar | G06F 9/45504 717/168 |
| 2015/0082239 A1* | 3/2015 | Zhao | H04L 67/2823 715/788 |
| 2015/0169871 A1* | 6/2015 | Achutha | G06F 21/6218 726/1 |
| 2015/0281258 A1* | 10/2015 | Watkins | G06Q 30/0277 726/23 |

\* cited by examiner

SYSTEM AND METHOD OF PROCESSING FOR FLEXIBLE INTERCEPTION OF COMMUNICATION BETWEEN SYSTEM LAYERS

FIELD OF INVENTION

The present disclosure generally relates to a system in which communication between system layers of the system can be flexibly intercepted, and a method of processing/processing method in association with the system.

BACKGROUND

Processing systems are typically capable of performing processing tasks to enable processed signals to be visually and/or audibly perceivable. This will be discussed by way of example with reference to FIG. 1.

FIG. 1 shows a typical processing system 100 which includes a number of system layers 102, a system directory 104 and an input portion 106. In general, the input portion 106 and the system directory 104 can be coupled to the system layers 102.

The system layers 102 can include an applications layer 102a, an engine layer 102b, a library layer 102c, an operating system layer 102d and an output layer 102e.

The applications layer 102a can be coupled to the engine layer 102b. The engine layer 102b can be coupled to the library layer 102c. The library layer 102d can be coupled to the operating system layer 102d. The operating system layer 102d can be coupled to the output layer 102e. The operating system layer 102d can be further coupled to the applications layer 102a and the system directory 104.

Furthermore, as shown, the input portion 106 can be coupled to the applications layer 102a.

In an exemplary scenario, the processing system 100 can correspond to an electronic device operable to play a game. Further, the processing system 100 can be based on an Android® based operating system (OS). Specifically, the processing system 100 can correspond to a portable electronic device such as a Smartphone and the input portion 106 can be a touch sensitive screen which is capable of sensing touch from a user.

In this regard, the applications layer 102a can be related to a game based application, the engine layer 102b can be a game engine, the library layer 102c can be related to an Open Graphics Library and the operating system layer 102d can be related to an Android® based OS layer.

For example, a user can play a game on the electronic device by touching the input portion 106. Therefore, user touch sensed by the input portion 106 can be considered to be input signals. The input signals can be processed by the input portion 106 and communicated to the applications layer 102a. The processed input signals can be communicated to the applications layer 102a to control, for example, game play (e.g., events and/or actions) as the game progresses.

Game based applications (i.e., at the applications layer 102a) typically rely on game engines (i.e., at the engine layer 102b) for processing tasks which are graphics and/or audio related.

Operationally, the applications layer 102a can be configured to generate and communicate application signals to the engine layer 102b based on input signals received from the input portion 106. Additionally, as will be discussed later in further detail, the applications layer 102a can be configured to generate and communicate a load request signal to the operating system layer 102d (as signified by arrow 110).

The engine layer 102b can be configured to receive and process the application signals to produce engine signals. For example, the engine layer 102b can be configured to receive and process application signals in a manner so as to extract metadata. Metadata can, for example, relate to movement of movable game characters in a game and/or appearance of game characters in a game. In this regard, metadata can, for example, correspond to the engine signals.

The engine layer 102b can be further configured to communicate the engine signals to the library layer 102c.

The library layer 102c can, for example, correspond to an application programming interface (API) for the purpose of rendering two dimensional (2D) and/or three dimensional (3D) electronic graphics. One such example is OpenGL® which is an industry standard for computer graphics with defined APIs. The API can be based on a system file which can be loaded from the system directory 104.

Earlier mentioned, the applications layer 102a can be configured to generate and communicate a load request signal to the operating system layer 102d. Based on the load request signal received, the operating system layer 102d can generate and communicate an instruction signal to the system directory 104 (as signified by arrow 112). Based on the instruction signal received, the system directory 104 can load (as signified by arrow 114) a system file, which resides in the system directory 104, to the library layer 102c. The system file can have a system file name. The system file name can be associated with a file name which is unique only to the load request signal.

Therefore, the library layer 102c can be configured to receive and process the engine signals based on the system file to produce library signals. The library layer 102c can be further configured to communicate the library signals to the operating system layer 102d for further processing to produce driver signals. The operating system layer 102d can be further configured to communicate the driver signals to the output layer 102e for driving the output layer 102e so that visual and/or audible perception is possible. In this regard, the output layer 102e can, for example, correspond to a display screen and/or speaker driver(s).

In one example, each of the movable game characters can be associated with a fundamental appearance which can be visually perceived via the output layer 102e. In another example, each of the movable game characters can also be associated with a fundamental audio track (e.g., soundtrack/sound effect) which can be audibly perceived via the output layer 102e.

Hence each of the movable game character(s) can be associated with a fundamental property/attribute which can be in relation to one or both of the fundamental appearance and the fundamental audio track.

Appreciably, conventional processing techniques associated with the typical processing system 100 do not facilitate processing in an efficient and/or user friendly manner. Specifically, conventional processing techniques do not facilitate modifications to the aforementioned fundamental property in an efficient and/or user friendly manner.

In one example, even though processed input signals can be communicated to the applications layer 102a to control, game play (e.g., events and/or actions) as the game progresses, it is appreciable that the fundamental appearance associated with a game character does not change. For example, a game character can be associated with an appearance of an apple. Hence the fundamental appearance of the game character is an apple and processed input signals can be communicated to control movement of the apple during game play. However, the fundamental appearance of the game character being controlled remains an apple despite change in location of the game character during game play.

In this regard, if modifications to the fundamental appearance of the game character are desired, there may be a need to modify game sourcecode and/or release packages (i.e., at/prior to the applications layer 102a).

Therefore, conventional processing techniques do not facilitate modifications to the aforementioned fundamental property in an efficient and/or user friendly manner and it is hence desirable to provide a solution to address at least one of the foregoing problems.

SUMMARY OF THE INVENTION

In accordance with an aspect of the disclosure, a method for dynamically changing a fundamental attribute of an object in a game is provided. The method can be a method of processing/processing method suitable for dynamically changing a fundamental attribute of an object in a game.

The game can be played using a system. The system can have a system directory and a plurality of system layers. The system directory can include a system file and a plurality of system layers can include a transmit layer and a receive layer. Data signals can be generated by the transmit layer and communicated from the transmit layer to the receive layer.

The method can include identifying the object. The fundamental attribute of the object can be associated with the system file when data signals communicated from the transmit layer are processed at the receive layer based on the system file.

The method can include inserting a configuration file to the system directory.

The method can include intercepting communication between the transmit layer and the receive layer so that the fundamental attribute of the identified object is modified based on the configuration file.

In one embodiment, the fundamental attribute of the identified object is related to fundamental appearance of the identified object.

The fundamental appearance of the identified object can, in one example, be modified such that the shape associated with the identified object is retained whilst remaining appearance of the identified object is replaced by an advertisement.

The fundamental appearance of the identified object can, in another example, be modified such that an advertisement in the shape of the identified object replaces the fundamental appearance of the identified object.

BRIEF DESCRIPTION OF THE DRAWINGS

Embodiments of the disclosure are described hereinafter with reference to the following drawings, in which.

DETAILED DESCRIPTION

Figure 1:
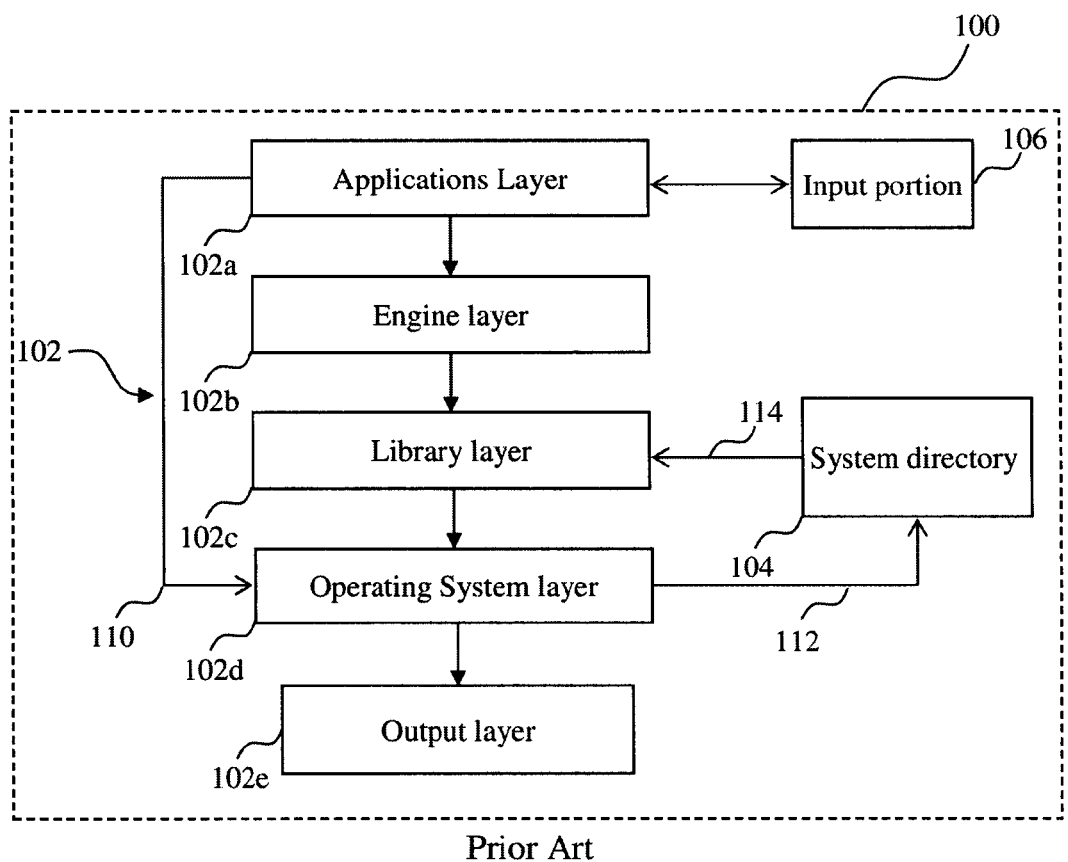
FIG. 1 shows a typical processing system which includes a number of system layers such as an engine layer and a library layer, a system directory and an input portion.

The present disclosure contemplates that, to address one or more of the foregoing problems, it is desirable to provide a way to flexibly intercept communication between any two of the system layers 102 of FIG. 1 and process the intercepted signals. In this manner, the aforementioned fundamental property/attribute can be modified in an efficient and/or user friendly manner. This will be discussed in further detail hereinafter with reference to FIG. 2 to FIG. 6.

Figure 2:
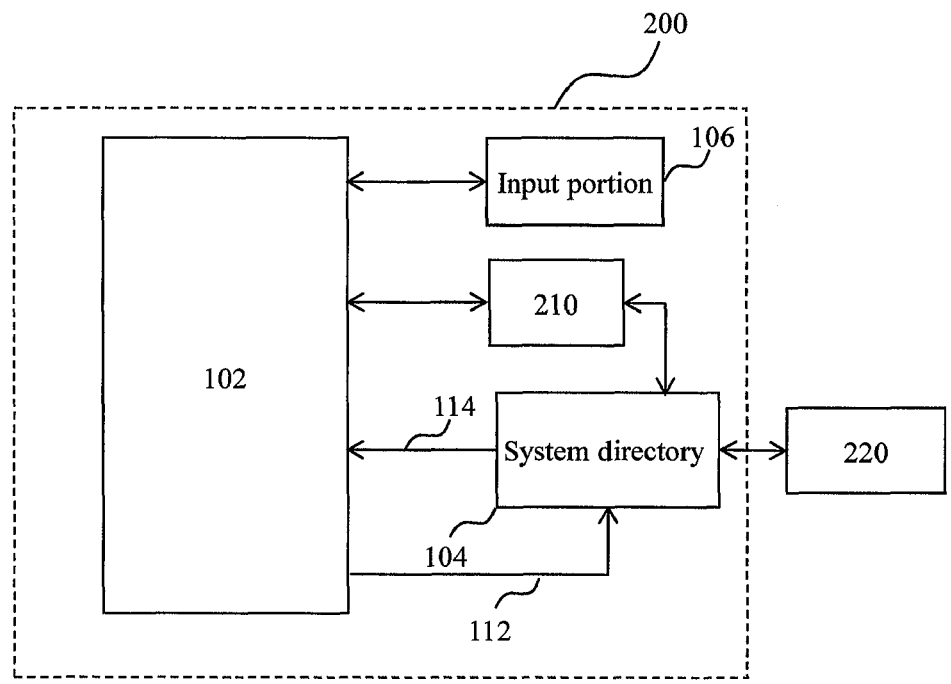
FIG. 2 shows a system having an intercept layer which can intercept communication between any two layers of the system layers of FIG. 1, in accordance with an embodiment of the disclosure.

Referring to FIG. 2, a system 200 is shown in accordance with an embodiment of the disclosure. The system 200 includes the system layers 102, the system directory 104 and the input portion 106 of FIG. 1. In this regard, the foregoing discussion, where appropriate, with respect to FIG. 1, analogously applies.

In addition to the system layers 102, the system directory 104 and the input portion 106, the system 200 includes an intercept layer 210. The intercept layer 210 can be coupled to the system layers 102 and the system directory 104. Furthermore, as shown, an update module 220 can be coupled to the system 200.

The intercept layer 210 can be configured to intercept communication between any two layers of the system layers 102. In one example, the intercept layer 210 can be configured to intercept communication between the applications layer 102a and the engine layer 102b. In another example, the intercept layer 210 can be configured to intercept communication between the engine layer 102b and the library layer 102c. In yet another example, the intercept layer 210 can be configured to intercept communication between the library layer 102c and the operating system layer 102d. In yet a further example, the intercept layer 210 can be configured to intercept communication between the operating system layer 102d and the output layer 102e. This will be discussed in further detail with reference to FIG. 3 by way of an example.

The update module 220 can be coupled to the system directory 104. The update module 220 can be configured to generate and communicate update signals to the system directory 104. The update signals can be communicated from the update module 220 to perform one or more of the following tasks:

1) Updating/modifying (i.e., changing content but not the name(s) of the system file(s)) one or more system files residing in the system directory 104.
2) Renaming one or more system files (i.e., changing the name(s) of the system file(s) but not making any changes to content of the system file(s)) residing in the system directory 104.
3) Modifying/updating (i.e., changing content) and renaming one or more system files residing in the system directory 104
4) Adding one or more new files (i.e., not originally available in the system directory 104) to the system directory 104.

The update module 220 can, for example, represent a telecommunication service provider (i.e., Telco) providing system updates to its subscribers using Android® OS based devices over a communications network (e.g., internet).

Although it is mentioned that the system 200 can include an intercept layer 210, it is appreciable that the intercept layer 210 can in an alternative arrangement, be separate from (i.e., external to) the system 200. In this regard, the intercept layer 210 can be in the form of an interceptor module corresponding to an apparatus or device or module operable or suitable for use with the system 200. In this regard, the intercept layer 210 can, for example, be in the form of an interceptor module (i.e., an apparatus) coupled to the system 200. In yet an alternative arrangement, the intercept layer 210 can be in the form of an interceptor module which can be part of an apparatus or a device coupled to the system 200 (in which case, it can be said that an apparatus which includes the interceptor module can be operated with/suitable for use with/coupled to the system 200). In yet a further alternative arrangement, the intercept layer 210 can be residing in another system coupled to the system 200 (e.g., the intercept layer 210 can be a part of another computer which can be coupled to the system 200).

As mentioned, the intercept layer 210 can be configured to intercept communication between any two layers of the system layers 102. This will be discussed in further detail with reference to FIG. 3 by way of an example hereinafter.

Figure 3:
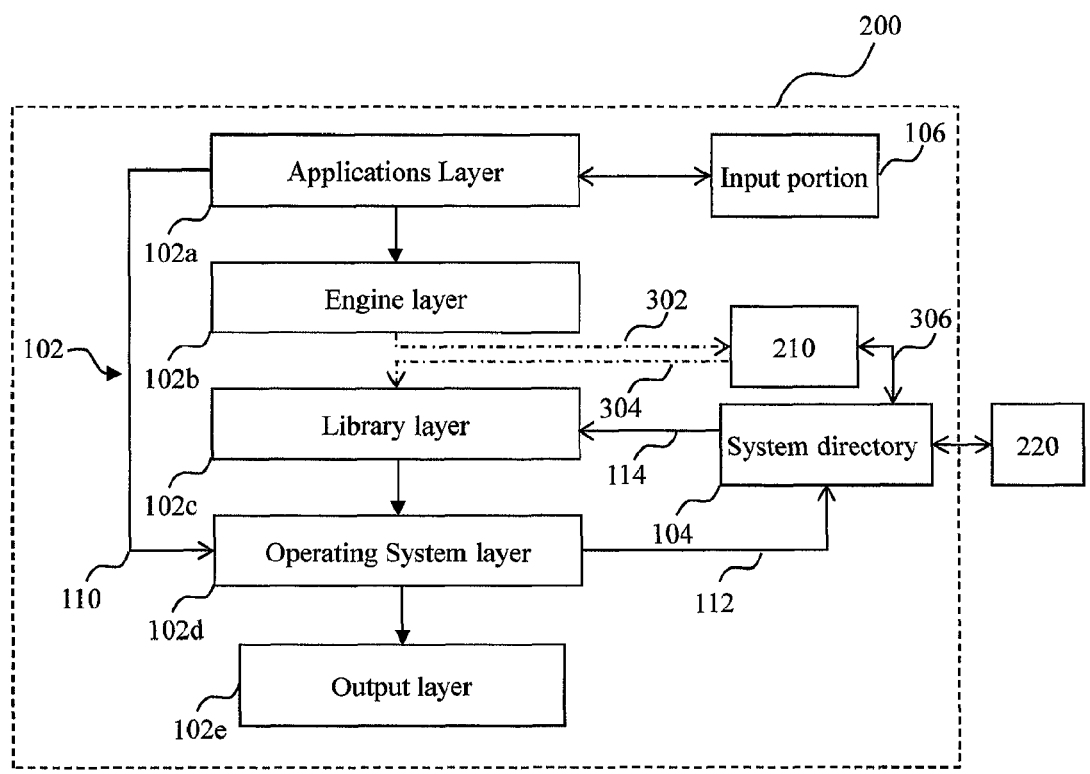
FIG. 3 shows, by way of example, the intercept layer of FIG. 2 can intercept communication between the engine layer and the library layer, in accordance with an embodiment of the disclosure.

FIG. 3 shows that the intercept layer 210 can, for example, be configured to intercept (as signified by arrows 302 and 304) communication between the engine layer 102b and the library layer 102c.

Earlier mentioned, the engine layer 102b can be configured to communicate the engine signals to the library layer 102c and the library layer 102c can be configured to receive and process the engine signals to produce library signals. The system directory 104 can load a system file, which resides in the system directory 104, to the library layer 102c. The system file can have a system file name. The system file name can be associated with a file name which is only unique to the load request signal. The library layer 102c can be configured to process the received engine signals based on the loaded system file to produce library signals.

Also mentioned earlier, the API for the purpose of rendering two dimensional (2D) and/or three dimensional (3D) electronic graphics can be based on the system file. The system file can also include, for example, a protocol portion. The protocol portion can serve to enable a communication path between one system layer and another system layer to be properly established (initialization protocol, handshaking protocol etc.).

The update module 220 can be configured to communicate update signals to the system directory 104 to rename the system file and add a new file to the system directory 104. The new file added can correspond to a configuration file which did not previously exist in the system directory 104. Additionally, the configuration file can be associated with a file name which is identical to the original file name of the system file. In this regard, the configuration file can be associated with a file name which is unique only to the load request signal.

Therefore, when a load request signal is communicated per earlier discussed, it is appreciable that the configuration file is loaded instead of the system file since the configuration file is now associated with a file name which is unique to the load request signal and the original system file has been renamed.

Specifically, the configuration file can be loaded (as signified by arrow 306) from the system directory 104 to the intercept layer 210.

The intercept layer 210 can be configured to generate and communicate an intercept request signal to the system directory 104. The renamed system file can be associated with a file name which is unique only to the intercept request signal. Based on the intercept request signal communicated from the intercept layer 210, the renamed system file can be loaded to the library layer 102c.

Therefore, the engine signals can be processed at the intercept layer 210 based on the configuration file to produce intercept signals. Hence, the intercept signals can correspond to modified engine signals. Appreciably, the engine signals can be processed based on the configuration file instead of the system file.

The configuration files can include instructions to modify content (e.g., modify appearance) associated with the engine signals as will be discussed later in further detail with reference to an exemplary scenario. However, it is also appreciable that the configuration files may, for example, not contain the protocol portion necessary to establish a proper communication path to the operating system layer 102d and/or the intercept layer 210 may not have the capability to facilitate rendering in the same manner as the library layer 102c (e.g., due to absence of appropriate API at the intercept layer 210). Therefore, it is possible that the modified engine signals (i.e., the intercept signals) communicated from the intercept layer 210 are not in a form suitable for further communication to and/or processing by the operating system layer 102d. Hence the intercept signals can be communicated to the library layer 102c where the renamed system file is loaded. The intercept signals can be processed based on the renamed system file to produce modified library signals which can be further communicated to the operating system layer 102d from the library layer 102c. Appreciably, since the renamed system file is identical to the original system file (i.e., prior to being renamed) residing in the system directory 104, the intercept signals can be processed based on appropriate API and/or protocol portion so as to produce modified library signals which are in a format suitable for further communication to and processing by the operating system layer 102d.

In essence, the intercept layer 210 can be configured to intercept communication between the engine layer 102b and the library layer 102c so that the engine signals are processed based on the configuration file instead of the system file. The configuration file can include instruction signals for modifying content associated with the engine signals. However, modified engine signals (i.e., the intercept signals) may not be in a format suitable for further processing by the operating system layer 102d. Therefore the intercept layer 210 can be further configured to operate in tandem with the library layer to ensure that the modified engine signals are further processed to produce signals (i.e., modified library signals) suitable for communication to and processing by the next succeeding layer (i.e., the operating system layer 102d). Therefore the configuration file loaded to the intercept layer 210 can be considered to serve the purpose of updating/modifying content associated with the engine signals while the renamed system file loaded to the library layer 102c can be considered to serve the purpose of formatting the modified engine signals for communication to and processing by the next succeeding system layer (i.e., operating system layer 102d).

To put the foregoing in perspective, the system 200 will be discussed in further detail hereinafter in the context of the applications layer 102*a* being associated with, for example, a game based application.

In this regard, the applications layer 102*a* can be configured to signal communicate game data to the engine layer 102*b*. Game data can correspond to the aforementioned application signals. The engine layer 102*b* can, for example, be a game engine.

Usually, in a game, there will be one or more game characters and one or more game environments (i.e., scene setting) which can be visually perceived via the output layer 102*e*. In the game, there can be a storyline or game rules and a gamer can play the game in accordance with the storyline or game rules. For example, there may be a need for the gamer to move one or more game characters in a game environment so as to achieve a certain objective. Appreciably, in a game, there can be one or more movable game characters and/or one or more stationary game characters. The movable game character(s) can be moved in accordance with gamer control to achieve a certain objective in the game. Furthermore, the game can include accompanying game audio such as background music, soundtracks and/or sound effects which can be audibly perceived.

For example, in a bowling game, the game characters can include a bowler, a bowling ball and a plurality of bowling pins. The game environment can be a bowling alley. In this regard, the movable game characters can be the bowler and the bowling ball. The stationary game characters can be the bowling pins. The game objective can be to knock down the bowling pins using the bowling ball and the game rules can correspond to real life bowling rules. In this regard, based on gamer control, the bowler and the bowling ball can be moved in a manner so as to knock down as many bowling pins as possible. The game audio can be the sound effect of a bowling ball knocking bowling pins down as the bowling ball contacts the bowling pins (i.e., collision).

Therefore, game data can, for example, be associated with one or more game characters and/or one or more game environments. The game data can, for example, be further associated with game audio.

With regard to game audio, game data can include/be associated with audio accompaniment data. Accompaniment data can be associated with sound effects data, background music data and/or soundtrack data in relation, respectively, to the aforementioned sound effects, background music and/or soundtracks. Audio accompaniment data can further be associated with timing data. The audio accompaniment data can, for example, be audio files such as mp3 based audio files or be in the form of one or more audio streams. In this regard, the aforementioned sound effects data, background music data and/or soundtrack data can correspond/relate to audio files such as mp3 based audio files and/or be in the form of one or more audio streams. Timing data can relate to a specific instance/specific instances in the game when a certain audio file/certain audio files/audio stream(s) is/are played/accessed. The sound effects data, background music data, soundtrack data and/or timing data can be based on the system file communicated from the system directory 104.

Moreover, game data can include/be associated with one or both of object data corresponding to the aforementioned game character(s) and scene data corresponding to the aforementioned game environment(s). The object data and the scene data can be based on the system file loaded from the system directory 104.

Each of the object data and scene data can be associated with vertex data, texture data and color data. Additionally, earlier mentioned, in a game, there may be more than one game character. In this regard, the object data can be associated with several objects. Of the several objects, there could be one or more objects of interest. The remaining objects (i.e., aside the one or more objects of interest) can be considered secondary objects. In this regard, object data can be associated with one or both of object(s) of interest and secondary object(s).

In one example, the object(s) of interest and/or the secondary object(s) can be identified based on metadata communicated from the engine layer 102*b*. In another example, the object(s) of interest and/or the secondary object(s) can be identified based on input signals communicated from the input portion 106.

In a more specific example, movable game characters which can be subjected to gamer control can be identified as object(s) of interest. For example, metadata communicated from the engine layer 102*b* can be indicative of which game characters are movable and can be subjected to gamer control. In another example, input signals communicated from the input portion 106 can be indicative of user (i.e., gamer) control of movable game characters visually perceived via the output layer 102*e*. In this regard, one or both of input signals communicated from the input portion 106 and engine signals communicated from the engine layer 102*b* can be indicative of object(s) of interest. In this regard, object(s) of interest can be identified based on one or both of input signals and engine signals.

The identified object of interest can be associated with a fundamental property (which can also be referred to as a fundamental attribute).

As mentioned earlier, the fundamental property can be in relation to one or both of the fundamental appearance and the fundamental audio track. The fundamental appearance can be defined by the aforementioned vertex data, texture data and/or color data. The fundamental audio track can be defined by the aforementioned sound effects data, background music data, soundtrack data and/or timing data.

In one example, it is desirable to modify the fundamental appearance (e.g., visual appearance of a bowling ball). The fundamental appearance can be defined by the vertex data, texture data and/or color data associated with the identified object of interest.

Since the intercept layer 210 can be configured to intercept communication between the engine layer 102*b* and the library layer 102*c* so that the engine signals are processed based on the configuration file instead of the system file, it is appreciable that any of the vertex data, texture data and/or color data associated with the indentified object of interest can be modified based on the configuration. Specifically, a different set of vertex data, texture data and/or color data can be provided based on the configuration file as compared to those provided based on the system file.

Therefore, it is appreciable that the fundamental appearance of the identified object of interest can be modified/altered/replaced by virtue of the configuration file.

There can be a number of useful applications in relation to the aforementioned change in fundamental appearance.

One such example is in the aspect of commercial advertising. In one example, the fundamental appearance of the object of interest can be replaced. For example, where the object of interest is a bowling ball (i.e., visual appearance of a bowling ball) and thus has a fundamental appearance associated with a bowling ball, the fundamental appearance of the object of interest can be replaced by an advertisement banner for a product (e.g., an advertisement banner for a travel package by a travel agency). Therefore, when playing the aforementioned bowling game where the object of interest has been identified as a bowling ball (i.e., object of interest being associated with the fundamental appearance of a bowling ball) it can be visually perceived that an advertisement banner in the shape of a ball is being rolled across the bowling alley instead of a bowling ball. Hence the advertisement banner can be inserted into the game both dynamically and in a manner which is not visually obstructive to the gamer. For example, since the fundamental appearance of the object of interest is effectively replaced by the advertisement banner (i.e., visual perception of the advertisement banner in the shape of a ball rolling across the bowling alley during gameplay), the gamer's overall visual appreciation of, for example, the game environment (e.g., the bowling alley) will not be significantly detracted.

Thus, it is appreciable that the fundamental property (e.g., fundamental appearance) of the object of interest (e.g., bowling ball) can be modified without having to modify game sourcecode and/or release packages. In this regard, modification of fundamental property can be facilitated in an efficient and/or user friendly manner. For example, an advertisement can be dynamically inserted into the game (e.g., effectively replacing one of the game characters such as the object of interest) without having to modify game sourcecode and/or release packages.

Additionally, although the foregoing discussed in the context of identifying an object of interest and modifying the fundamental appearance of the identified object of interest, it is appreciable that there can be other possibilities. One other possibility can, for example, be identifying a secondary object and modifying the fundamental audio track of the identified secondary object. Another possibility can, for example, be identifying an object of interest, and modifying both the fundamental appearance and fundamental audio track of the identified object of interest. Yet another possibility can, for example, be identifying an object of interest, and modifying the fundamental audio track of the identified object of interest. Yet a further possibility can, for example, be modifying the fundamental property (fundamental appearance and/or fundamental audio track) associated with the scene data (e.g., the fundamental appearance of the bowling alley can be replaced by an advertisement banner so that the bowling ball can be visually perceived to be rolling across an advertisement banner shaped as the bowling alley during gameplay).

In general, the engine layer 102b can be considered to be a transmit layer with respect to the library layer 102c since the library layer 102c is supposed to receive signals transmitted from the engine layer 102b (albeit intercepted by the intercept layer 102c). In this regard, the library layer 102c can be considered to be a receive layer with respect to the engine layer 102b. By the same token, as between, for example, the library layer 102c and the operating system layer 102d, the library layer 102c can be considered to be a transmit layer and the operating system layer 102d can be considered to be a receive layer. Analogously, between, for example, the operating system layer 102d and the output layer 102e, the operating system layer 102d can be considered to be a transmit layer whereas the output layer 102e can be considered to be a receive layer. As a further example, as between the applications layer 102a and the operating system layer 102d, the applications layer 102a can be considered to be a transmit layer and the operating system layer 102d can be considered to be a receive layer.

Moreover, based on the forgoing discussion, it can be appreciated that the system layers 102 are based on a hierarchical structure in which the layer before its succeeding layer can be considered to be a higher layer (i.e., the succeeding layer can be considered to be a lower layer). Specifically, the transmit layer can be considered to be a higher layer relative to the receive layer and the receive layer can be considered to be a lower layer relative to the transmit layer.

Figure 4:
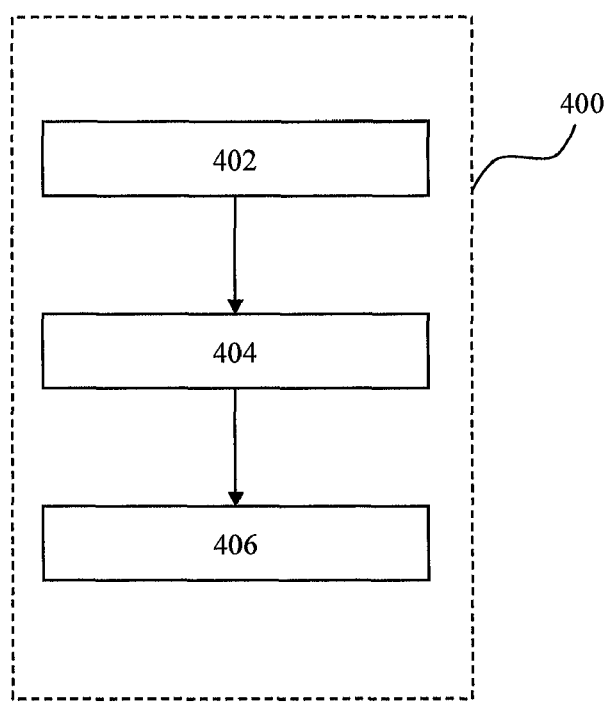
FIG. 4 shows a processing method in association with the system of FIG. 2, in accordance with an embodiment of the disclosure.

Referring to FIG. 4, a processing method 400 in association with the system 200, in accordance with one embodiment of the disclosure, is shown.

The processing method 400 can include an identification step 402, an interception step 404 and a modification step 406.

At the identification step 402, one or more objects of interest and/or one or more secondary objects can be identified.

It is possible to identify, for example, an object of interest based on input signals from the input portion 106. The input portion 106 can, for example, be a touch based screen display unit. For example, in the bowling game, a gamer can manipulate movement of the bowler and/or movement of the bowling ball by touching the input portion 106. Therefore, input signals can be based on the gamer's contact of the input portion 106 to move movable game character(s) which can be associated with movement of the object(s) of interest (i.e., a bowler and/or a bowling ball). Therefore, an object visually perceived to be in the region coinciding with the gamer's contact of the input portion 106 can be identified as an object of interest (e.g., the bowling ball).

As an alternative, it is possible to identify an object of interest based on salient region. Saliency may be based on detection of high activity in the game environment during game play. For example, in the bowling game, the bowling ball may be rolling across the bowling alley. Such an activity (bowling ball rolling) can be considered as high activity. Therefore the bowling ball can be identified as an object of interest.

At the interception step 404, communication between any two layers of the system layers 102 can be intercepted. Specifically, an intercept layer 220 can be provided for interception of communication.

As mentioned earlier, the intercept layer 210 can be configured to intercept communication between any two layers of the system layers 102. In one example, the intercept layer 210 can be configured to intercept communication between the applications layer 102a and the engine layer 102b. In another example, the intercept layer 210 can be configured to intercept communication between the engine layer 102b and the library layer 102c. In yet another example, the intercept layer 210 can be configured to intercept communication between the library layer 102c and the operating system layer 102d. In yet a further example, the intercept layer 210 can be configured to intercept communication between the operating system layer 102d and the output layer 102e.

In general, the intercept layer 210 can be configured to intercept communication between the transmit layer and the receive layer.

In this regard, it is appreciable that the intercept layer 220 can be configured to flexibly intercept communication between any two layers of the system layers 102 so that processing can be based on the configuration file instead of the system file.

At the modification step 406, fundamental property of the identified object(s) of interest and/of the identified secondary object(s) can be modified/replaced/altered based on the configuration file.

Figure 5:
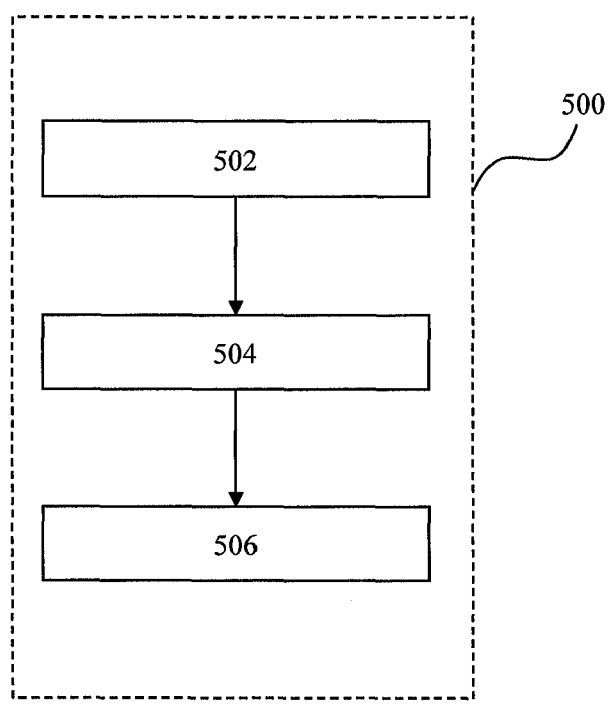
FIG. 5 shows a method of processing in association with the system of FIG. 2, in accordance with an embodiment of the disclosure.

Referring to FIG. 5, a method of processing 500 in association with the system 200, in accordance with one embodiment of the disclosure, is shown.

The method of processing 500 can include a renaming step 502, an insertion step 504 and an interception step 506.

At the renaming step 502, the system file can be renamed as discussed earlier with reference to FIG. 2 and FIG. 3.

At the insertion step 504, the configuration file can be inserted into the system directory 104 as discussed earlier with reference to FIG. 2 and FIG. 3.

At the interception step 506, the interception layer 210 can be provided to intercept communication between the transmit layer and the receive layer as discussed earlier with reference to FIG. 2 and FIG. 3.

Figure 6:
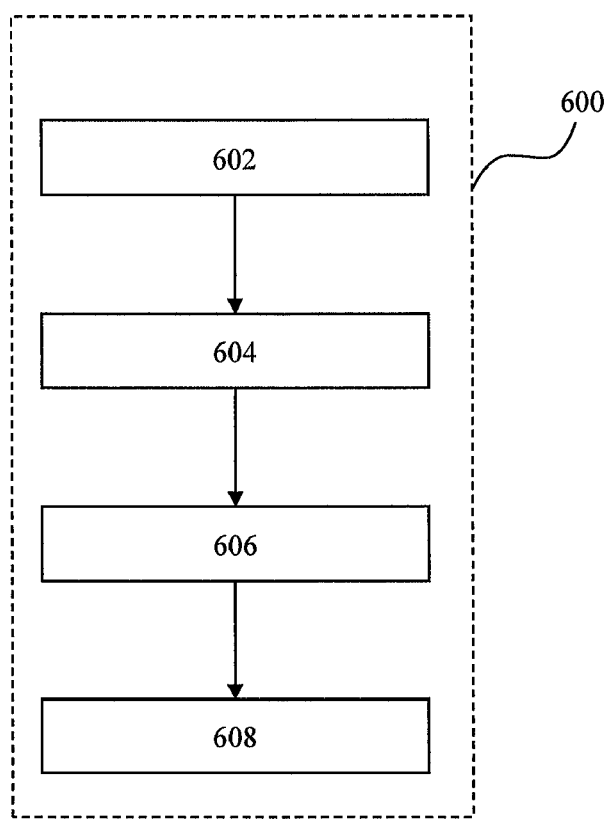
FIG. 6 shows a method for dynamically changing a fundamental attribute of an object in a game played using the system of FIG. 2, in accordance with an embodiment of the disclosure.

Referring to FIG. 6, a method 600 for dynamically changing a fundamental attribute of an object in a game (e.g., the earlier discussed bowling game) played using the system 200 of FIG. 2 is shown, in accordance with an embodiment of the disclosure. The method 600 can relate to a method of processing/a processing method.

In the aforementioned context of the applications layer 102a being associated with, for example, a game based application, the object of the method 600 can correspond to one or more of the following:

1) The object(s) of interest
2) The secondary object(s)
3) game environment(s)

Therefore, the object can be based on the aforementioned object data and/or scene data. In this regard, the object can be associated with a fundamental property (which can also be referred to as a fundamental attribute) which can be related to, as discussed earlier, one or both of fundamental appearance and fundamental audio track.

As mentioned earlier, the system 200 includes a plurality of system layers 102 and a system directory 104. The system layers 102 can include a transmit layer (e.g., the engine layer 102b) and a receive layer (e.g., the library layer 102c). The system directory 104 can include a system file (i.e., the system file can be considered to reside in the system directory 104).

Data signals (e.g., corresponding to the aforementioned engine signals) can be communicated from the transmit layer (e.g., the engine layer 102b) to the receive layer (e.g., the library layer 102c). When data signals communicated from the transmit layer are processed at the receive layer based on the system file, it is appreciable that the fundamental attribute of the object can be associated with the system file.

The method 600 can include identifying the object 602, inserting a configuration file to the system directory 604 and intercepting communication between the transmit layer and the receive layer 606.

The method 600 can further include renaming the file name of the system file 608. Specifically, the file name of the system file can be renamed such that the new file name (i.e., after being renamed) is different from its original file name. More specifically, the file name of the system file can be renamed such that the renamed file name of the system file is no longer unique to the load request signal. The configuration file inserted can have a file name which is unique only to the load request signal. Since the system file is renamed such that its new file name is no longer unique to the load request signal whereas the configuration file is given a file name which is unique to the load request signal, it is appreciable that, as between the system file and the configuration file, only the configuration file will be loaded (i.e., communicated from the system directory 104) when the load request signal is communicated to the system directory 104. In this regard, it is appreciable that no conflict as to which file (configuration file or system file) to load based on the load request signal will occur.

Communication between the transmit layer and the receive layer can be intercepted so that the fundamental attribute of the identified object is modified based on the configuration file. Specifically, communication between the transmit layer and the receive layer can be intercepted in a manner so that data signals are processed based on the configuration file instead of the system file.

As mentioned earlier, an intercept layer 210 can be provided for intercepting communication between the transmit layer and the receive layer. The configuration file can be loaded at the intercept layer 210 based on the load request signal communicated to the system directory 104. Since data signals from the transmit layer are communicated to the intercept layer 210 as opposed to the receive layer after interception by the intercept layer 210, the data signals from the transmit layer can be processed at the intercept layer 210 based on the configuration file to produce modified data signals (e.g., modified engine signals).

Further mentioned earlier, the intercept layer 210 can be further configured to communicate an intercept request signal to the system directory 104 so that the renamed system file can be loaded at the receive layer. Hence it is appreciable that the renamed system file has/is associated with a file name which is unique only to the intercept request signal. The modified data signals can be communicated from the intercept layer 210 to the receive layer. Therefore, the modified data signals can be further processed at the receive layer based on the renamed system file to, for example, produce output signals (e.g., modified library signals).

In one embodiment, the fundamental attribute of the identified object is related to fundamental appearance of the identified object. Fundamental appearance of the identified object can be associated with one or more visual characteristics such as shape, color, texture. The fundamental appearance of the identified object can be modified such that one or more of the visual characteristics (e.g., shape) associated with the identified object is/are retained whilst the remaining appearance (i.e., remaining visual characteristics excluding the one(s) being retained) of the identified object can be replaced by an advertisement (e.g., the earlier discussed advertisement banner).

In one example, in the context of the earlier discussed bowling game, the identified object can be the bowling ball. In this regard, the fundamental appearance of the bowling ball, as visually perceivable, can be associated with a shape of a sphere (i.e., shape data) having a smooth shiny orange surface (i.e., texture data and color data). Hence the visual characteristics of the bowling ball can include shape (i.e., sphere), texture (i.e., smooth shiny surface) and color (i.e., orange). Therefore, the fundamental appearance of the bowling ball can be modified such that only the smooth shiny orange surface appearance of the bowling ball is replaced by the advertisement banner whereas the sphere shape remains substantially unchanged.

In another example, in the context of the earlier discussed bowling game, the fundamental appearance of the identified object can be modified such that an advertisement (e.g., the advertisement banner) in the shape (e.g., sphere) of the identified object (e.g., the bowling ball) replaces the fundamental appearance (e.g., sphere and smooth shiny orange surface) of the identified object (e.g., the bowling ball).

Hence an advertisement can be inserted into the game both dynamically and in a manner which is not visually obstructive to the gamer. For example, since only the fundamental appearance of the objective of interest is effectively replaced by the advertisement banner (i.e., visual perception of the advertisement banner in the shape of a ball rolling across the bowling alley during gameplay), the gamer's overall visual appreciation of, for example, the game environment (e.g., the bowling alley) will not be significantly detracted.

In yet another example, in the context of the earlier discussed bowling game, the fundamental appearance of the identified object can be modified such that an advertisement (e.g., the advertisement banner) having/associated with a different shape (e.g., cube) from the shape (e.g., sphere) of the identified object (e.g., the bowling ball) replaces the fundamental appearance (e.g., sphere and smooth shiny orange surface) of the identified object (e.g., the bowling ball). In which case, visual perception could be of an advertisement in the shape of a cube rolling/"bouncing" across the bowling alley during gameplay. Such a modification can be useful where an advertisement can be inserted into the game dynamically with subtle changes to draw enough attention to the advertisement without being overly visually obstructive to the gamer.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

The invention claimed is:

1. A method for dynamically changing a fundamental attribute of an object in a game played using a system having a system directory which includes a system file and a plurality of system layers including a transmit layer and a receive layer, wherein data signals are communicable from the transmit layer to the receive layer, the method comprising:

identifying the object, the fundamental attribute of the object being associable with the system file when data signals communicated from the transmit layer are processed at the receive layer based on the system file;

inserting a configuration file to the system directory; and intercepting communication between the transmit layer and the receive layer so that the fundamental attribute of the identified object is modified based on the configuration file, wherein the fundamental attribute of the identified object is related to fundamental appearance of the identified object, and wherein the fundamental appearance of the identified object is modified such that the shape associated with the identified object is retained whilst remaining appearance of the identified object is replaced by an advertisement.

2. The method of claim 1, wherein the system file is loaded at the receive layer based on a load request signal communicated to the system directory, the system file having a file name unique only to the load request signal; and wherein the fundamental attribute of the object of interest is associable with the system file when data signals communicated from the transmit layer are processed at the receive layer based on the system file.

3. The method of claim 2 further comprising:

renaming the file name of the system file such that the file name of the system file is no longer unique to the load request signal, wherein the inserted configuration file has a file name which is unique only to the load request signal.

4. The method of claim 3, wherein an intercept layer is provided for intercepting communication between the transmit layer and the receive layer, wherein the configuration file is loaded at the intercept layer based on the load request signal communicated to the system directory, wherein data signals communicated from the transmit layer are received and processed at the intercept layer based on the configuration file to produce modified data signals, and wherein the intercept layer is configurable to communicate an intercept request signal to the system directory so that the renamed system file is loaded at the receive layer.

5. The method of claim 4, wherein the modified data signals are communicable from the intercept layer to the receive layer, the modified data signals being further processed at the receive layer based on the renamed system file.

* * * * *